United States Patent
Nguyen et al.

(10) Patent No.: US 11,775,289 B2
(45) Date of Patent: Oct. 3, 2023

(54) SOURCE CODE DEVELOPMENT INTERFACE FOR STORAGE MANAGEMENT

(71) Applicant: INTERNATIONAL BUSINESS MACHINES CORPORATION, Armonk, NY (US)

(72) Inventors: Trinh Nguyen, San Jose, CA (US); Tan Q. Nguyen, San Jose, CA (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 135 days.

(21) Appl. No.: 17/373,536

(22) Filed: Jul. 12, 2021

(65) Prior Publication Data
US 2023/0010808 A1    Jan. 12, 2023

(51) Int. Cl.
G06F 8/71    (2018.01)
G06F 8/30    (2018.01)
G06F 8/65    (2018.01)

(52) U.S. Cl.
CPC .............. *G06F 8/71* (2013.01); *G06F 8/315* (2013.01); *G06F 8/65* (2013.01)

(58) Field of Classification Search
CPC ..... G06F 8/71; G06F 8/36; G06F 8/65; G06F 11/3668; G06F 8/315
See application file for complete search history.

(56) References Cited

U.S. PATENT DOCUMENTS

| | | | |
|---|---|---|---|
| 5,018,060 A | 5/1991 | Gelb et al. | |
| 5,495,603 A | 2/1996 | Fruchtman et al. | |
| 7,761,848 B1* | 7/2010 | Chaffin | G06F 8/30 |
| | | | 726/8 |
| 8,103,621 B2 | 1/2012 | Brixius et al. | |
| 8,321,379 B2 | 11/2012 | Chang et al. | |
| 8,332,364 B2 | 12/2012 | Dao et al. | |
| 8,516,466 B2 | 8/2013 | Huber et al. | |
| 9,201,878 B2 | 12/2015 | Yaung et al. | |
| 9,619,472 B2 | 4/2017 | McCune et al. | |
| 2006/0236319 A1* | 10/2006 | Pinnix | G06F 8/71 |
| | | | 717/170 |
| 2008/0229300 A1* | 9/2008 | O'Brien | G06F 8/656 |
| | | | 717/168 |
| 2010/0088271 A1 | 4/2010 | Brixius et al. | |
| 2017/0315801 A1* | 11/2017 | Fullbright | G06F 8/20 |
| 2018/0101370 A1* | 4/2018 | Huang | G06F 8/447 |

FOREIGN PATENT DOCUMENTS

KR    101127304    4/2012

* cited by examiner

*Primary Examiner* — Thuy Dao
*Assistant Examiner* — Cheneca Smith
(74) *Attorney, Agent, or Firm* — KONRAD RAYNES DAVDA & VICTOR LLP; Rabindranath Dutta (57) ABSTRACT

Source code routines are generated for storage management in a storage code development management tool. A script that includes the source code routines is generated. The storage code development management tool receives indications based on an execution of an object code generated via execution of the script. The storage code development management tool modifies the source code routines based on the received indications.

18 Claims, 10 Drawing Sheets

Details of a development environment for development of source code routines for a storage management system

- Pick an ACS sample in the folder on the left panel and display it on the right panel. — 602

- Click on a variable and statement on the left panel to expand its definition and usage description. — 604

- The left panel has all the ACS constants, Read-Only Variables, Read-Write variables, and statements to — 606 drag to the right panel.

- The definition and usage description for each existing or new variable may be automatically retrieved — 608 from SMS and added to the tool.

- Hover over each keyword in a statement will display its description and possible usages. — 610

- Hover over each SMS construct name in a statement may display its definition in either the SCDS the — 612 ACS routine will be applied to or the active configuration.

- Hover over each SMS construct name in a statement may display the possible paths that SMS — 614 construct name can be set.

- Hover over an SMS construct name which happens to be a storage group name may display options to — 616 display the storage group definition or to list out the associated volume list of the storage group.

- Click 'Verify' button may trigger a 'login' to a z/OS system to verify. The verification process may — 618 internally submit a Naviquest job other job to verify ACS routine.

- There's also 'Compile' button to generate object code which can be done via Naviquest job as well. — 620

- After the ACS routine is compiled successfully, click 'Apply' to apply it to the system. It will apply to the — 622 active SCDS and display status.

- Keep tracks of ACS routines in database or on the systems to be retrieved later. — 624

SOURCE CODE DEVELOPMENT INTERFACE FOR STORAGE MANAGEMENT

BACKGROUND

1. Field

Embodiments relate to a source code development interface for storage management.

2. Background

Computers and computer operating systems may be used to store and manage information. Typically, such information is stored and managed in interconnected storage systems. Such systems may be complex, involving many interconnected storage devices, communication paths, etc., and management functionality of such systems may be performed by storage controllers. To further automate and simplify the storage, management, and retrieval of information, so-called "system-managed storage" allows the operating system (OS) operable in such storage environments to facilitate many storage management tasks that were previously manually performed by system administrators.

In storage environments without system-managed storage allocations and deletions of storage resources may occur with little or no control, on whichever storage unit (such as a volume) the person performing the storage allocations happens to choose. System-managed storage addresses this problem by placing device selection under the control of the system. The system does this by using a policy established by the storage administrator who defines a volume pooling structure made up of storage groups. The storage administrator may also write automatic class selection (ACS) routines that define which data sets can be allocated in which storage groups. Using these ACS routines, the storage administrator can allow the system to control as much or as little allocation of storage groups as desired. When a new allocation occurs, the system uses the ACS routines to determine a set of storage groups in which the dataset is eligible to be allocated. The system then considers criteria such as space and performance to select the specific volume or volumes on which to perform the allocation.

In the z/OS operating system, the ACS routines may be used to determine the storage management system (SMS) classes and storage groups for data sets and objects in an SMS complex. For storage administrators, ACS routines may automate and centralize the process of determining SMS classes and storage groups. ACS routines may also help in the conversion of data sets to an SMS environment. ACS may be regarded as a programming language for storage management, and SMS constructs are representations of data structures for storage management that are used in the ACS routines.

A programming tool or a software development tool is a computer program that software developers may use to create, debug, maintain, or otherwise support other programs and applications. Some common tools include source code editors and a compilers or interpreter. Other tools that are used may depend on the language and development methodology, and may include tools such as a debugger or a profiler. Tools may be for discrete programs, executed separately or may be parts of a single large program, called an integrated development environment (IDE). Tools may be used for checking language syntax or to assist a programmer in the validation of language syntax.

SUMMARY OF THE PREFERRED EMBODIMENTS

Provided are a method, system, and computer program product in which source code routines are generated for storage management in a storage code development management tool. A script that includes the source code routines is generated. The storage code development management tool receives indications based on an execution of an object code generated via execution of the script. The storage code development management tool modifies the source code routines based on the received indications.

In further embodiments, the storage code development management tool performs automatic generating, verifying, and applying of class selection routines utilizing predefined or modeled code blocks.

In yet further embodiments, responsive to selecting a source code routine sample in the storage code development management tool, a selection is made of a variable and statement to expand definition and usage description.

In additional embodiments, a retrieval is made of a definition and usage description for each existing or new variable from a storage management system via a language server. The retrieved definition and usage description is added to the source code development management tool for modifying the source code routines.

In yet additional embodiments, a source code routine is applied to an active configuration. The source code routine is verified by utilizing an internally submitted job request.

In certain embodiments, responsive to receiving a compile selection by a user, the object code is generated, and further in responsive to generating the object code, the object code is applied to a storage system.

In further embodiments, the source code routines are stored in a repository for subsequent retrieval.

BRIEF DESCRIPTION OF THE DRAWINGS

Referring now to the drawings in which like reference numbers represent corresponding parts throughout:

FIG. 6 illustrates a block diagram that shows the details of a development environment for development of source code routines for a storage management system, in accordance with certain embodiments;

DETAILED DESCRIPTION

In the following description, reference is made to the accompanying drawings which form a part hereof and which illustrate several embodiments. It is understood that other embodiments may be utilized and structural and operational changes may be made.

Code development in many computer languages is relatively easy because there are many web-based tools to automatically check language syntax, or to assist programmers with language syntax validation. However, it is almost impossible to have one tool for all programming languages. Certain source code routines, such as z/OS Automatic Class Selection (ACS) routines have their own set of small z/OS specific computer language syntax and rules that are hard to remember and use if programmers do not use them often enough, and there are no existing validation processes. Programmers have to spend a lot of time to look up the syntax and force an ACS routine with trial and error until it yields the expected outcome.

There no integrated development tool to pre-verify all existing keywords or statements for auto-completion for ACS routines. It takes too much time to write an ACS routine and force it with trial and error because system programmers need to keep track of each code path for each SMS construct classes or storage groups to remember how each SMS construct gets set. If system programmers create a relationship convention among their SMS classes or storage groups, they must somehow remember which classes need to be grouped together. It may be difficult for other programmers to maintain the existing ACS routine logic manually. Additionally, programmers have to remember the exact syntax, variables, and keyword, and then submit job for validation, and as a result it takes a great amount of effort to apply ACS routines to z/OS based storage systems.

Certain embodiments provide a web-based tool, application, or plugin IDE to lay out all the z/OS ACS routine predefined keywords, statements, and samples to allow users to visually manipulate the decision-making code blocks, logical statements, predefined keywords, verify all the syntactic and semantic errors, and apply object code directly to z/OS systems.

Certain embodiments improve the operations of a computational device by providing mechanisms on how to either submit a job or execute an application programming interface (API) to store the ACS routines into a source control data set (SCDS) and to activate the SCDS. Certain embodiments use any available application programming interface (API) to import the active z/OS storage management ACS routines from the system so that users are able to interactively update the logic of the ACS routines, including syntax highlighting, checking, and application to the imported system or a different system.

Exemplary Embodiments

Figure 1:
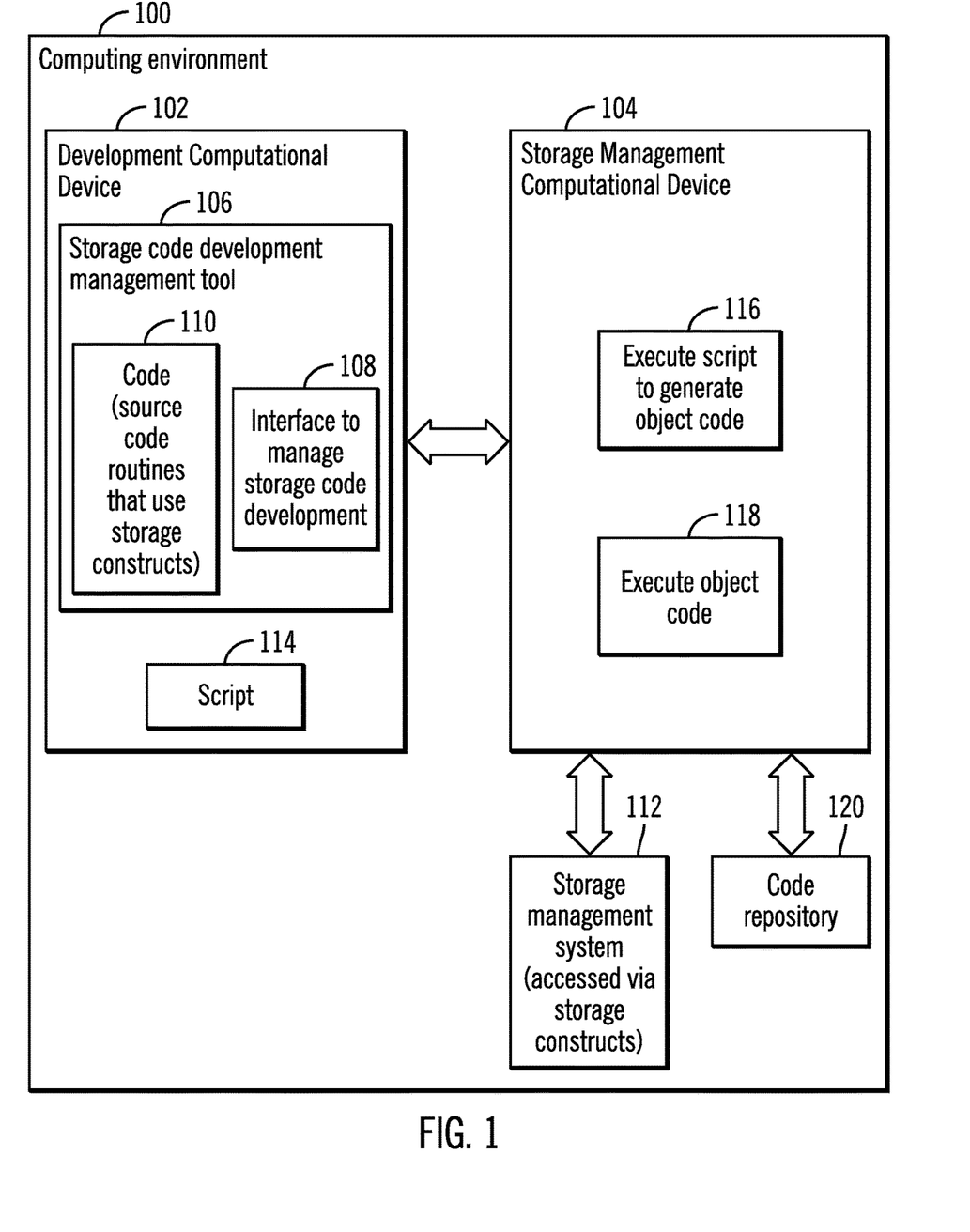
FIG. 1 illustrates a block diagram of a computing environment comprising a development computational device coupled to a storage management computational device, in accordance with certain embodiments.

FIG. 1 illustrates a block diagram of a computing environment 100 comprising a development computational device 102 coupled to a storage management computational device 104, in accordance with certain embodiments.

The development computational device 102 and the storage management computational device 104 may comprise any suitable computational device including those presently known in the art, such as, a personal computer, a workstation, a server, a mainframe, a hand held computer, a palm top computer, a telephony device, a network appliance, a blade computer, a processing device, a controller, etc. The development computational device 102 and the storage management computational device 104 may be elements in any suitable network, such as, a storage area network, a wide area network, the Internet, an intranet, etc.

The development computational device 102 may include a storage code development management tool 106, implemented in certain embodiment in software, hardware, firmware or any combination thereof. The storage code development management tool 106 may provide an interface 108 to manage storage code development, where the storage code 110 that is being developed by a programmer may use storage constructs that are used to access a storage management system 112 controlled by the storage management computational device 104.

The development computational device 102 may aggregate many segments of code 110 or different routines constructed out the codes 110 to generate one or more scripts 114 that are executed (shown via reference numeral 116) in the storage management computational device 104 to generate object code. The generated object code is executed (shown via reference numeral 118) in the storage management computational device 104.

The storage management computational device 104 also controls a code repository 120 that stores the code generated by the storage code development management tool 106. A single version or a plurality of versions of code may be stored in the code repository 120.

In certain embodiments, based on feedback provided by the execution of the object code by the storage management computational device 104, a programmer may modify the code 110 via the storage code development management tool 106 by using the features provided by the interface 108.

Figure 2:
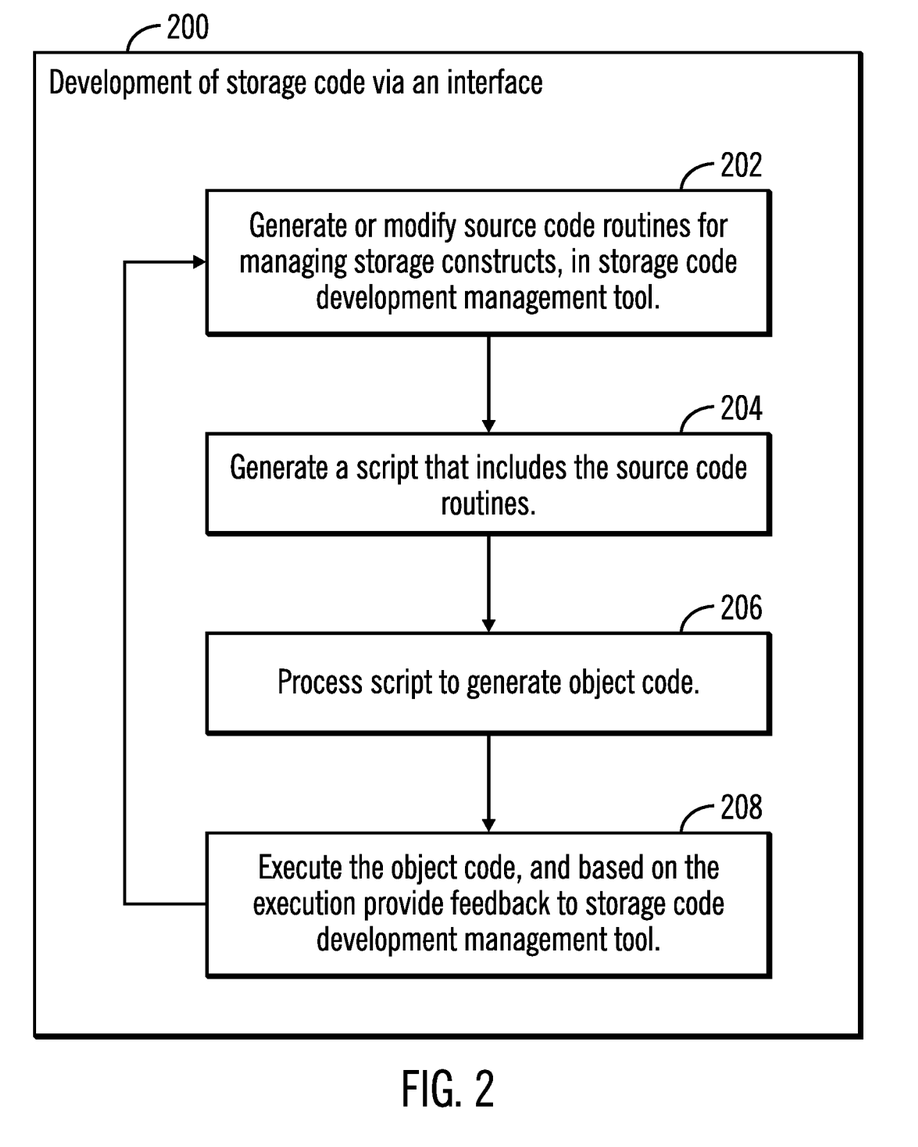
FIG. 2 illustrates flowchart for development of storage code via an interface, in accordance with certain embodiments.

FIG. 2 illustrates flowchart 200 for development of storage code via an interface, in accordance with certain embodiments. In certain embodiments the interface comprises the interface 108 of the storage code development management tool 106 that executes in the development computational device 102.

Control starts at block 202 in which a programmer generates or modifies source code routines 110 for managing storage constructs, in the storage code development management tool 106. Control proceeds to block 204 in which a script 114 that include a plurality of source routines is generated.

From block 204 control proceeds to block 206 in which the script is processed to generate object code in the storage management computational device 104. The object code is executed, and based on the execution the storage management computational device 104 provides a feedback to the storage code development management tool 106. The feedback may include information used to make code modifications easy for the programmer of the source code routines after control returns to block 202 from block 208.

Figure 3:
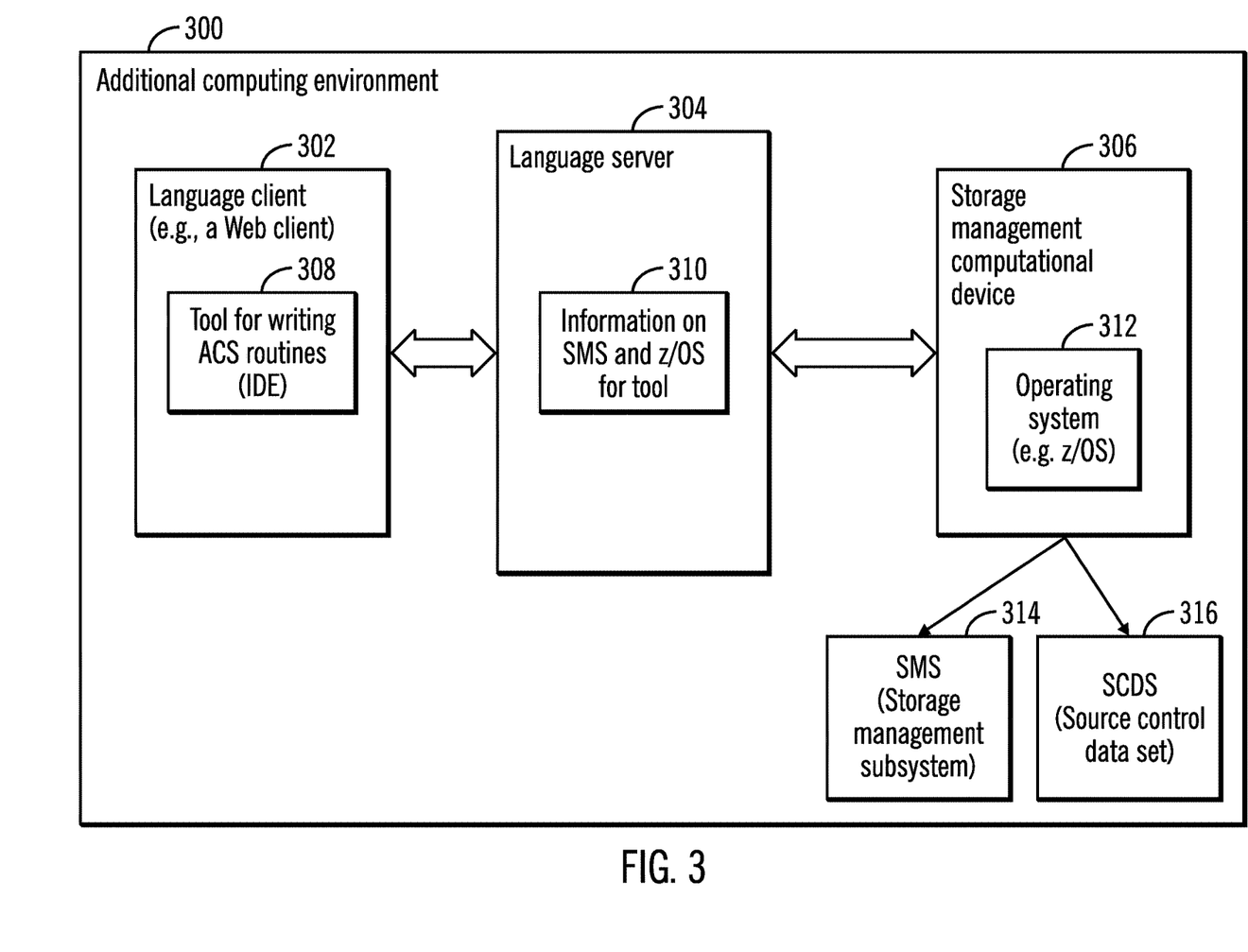
FIG. 3 illustrates a block diagram of an additional computing environment comprising a language client, a language server, and a storage management computational device, in accordance with certain embodiments.

FIG. 3 illustrates a block diagram of an additional computing environment 300 comprising a language client 302, a language server 304, and a storage management computational device 306, in accordance with certain embodiments. While FIG. 3 describes the computing environment in a z/OS operating system environment with ACS routines, other operating systems besides z/OS and other types of storage management routines besides ACS may be used in alternative environments.

The language client 302, the language server 304, and the storage management computational device 306 may comprise any suitable computational device including those presently known in the art, such as, a personal computer, a workstation, a server, a mainframe, a hand held computer, a palm top computer, a telephony device, a network appliance, a blade computer, a processing device, a controller, etc. The language client 302, the language server 304, and the storage management computational device 306 may be elements in any suitable network, such as, a storage area network, a wide area network, the Internet, an intranet, etc.

The language client 302 may comprise a web client, or any other type of client, and a tool 308 for writing ACS routines that comprise an IDE may execute in the language client 302. The language client 302 may be a web-based tool, a stand-alone application, or plugin to an existing IDE.

The language server 304 may provide information 310 on SMS and the z/OS operating system 312 to the tool 308, where the z/OS operating system 312 executes in the storage management computational device 306 that controls the SMS (storage management subsystem or storage management system) 314 and the source control data set (SCDS) 316 that comprises a code repository.

Figure 4:
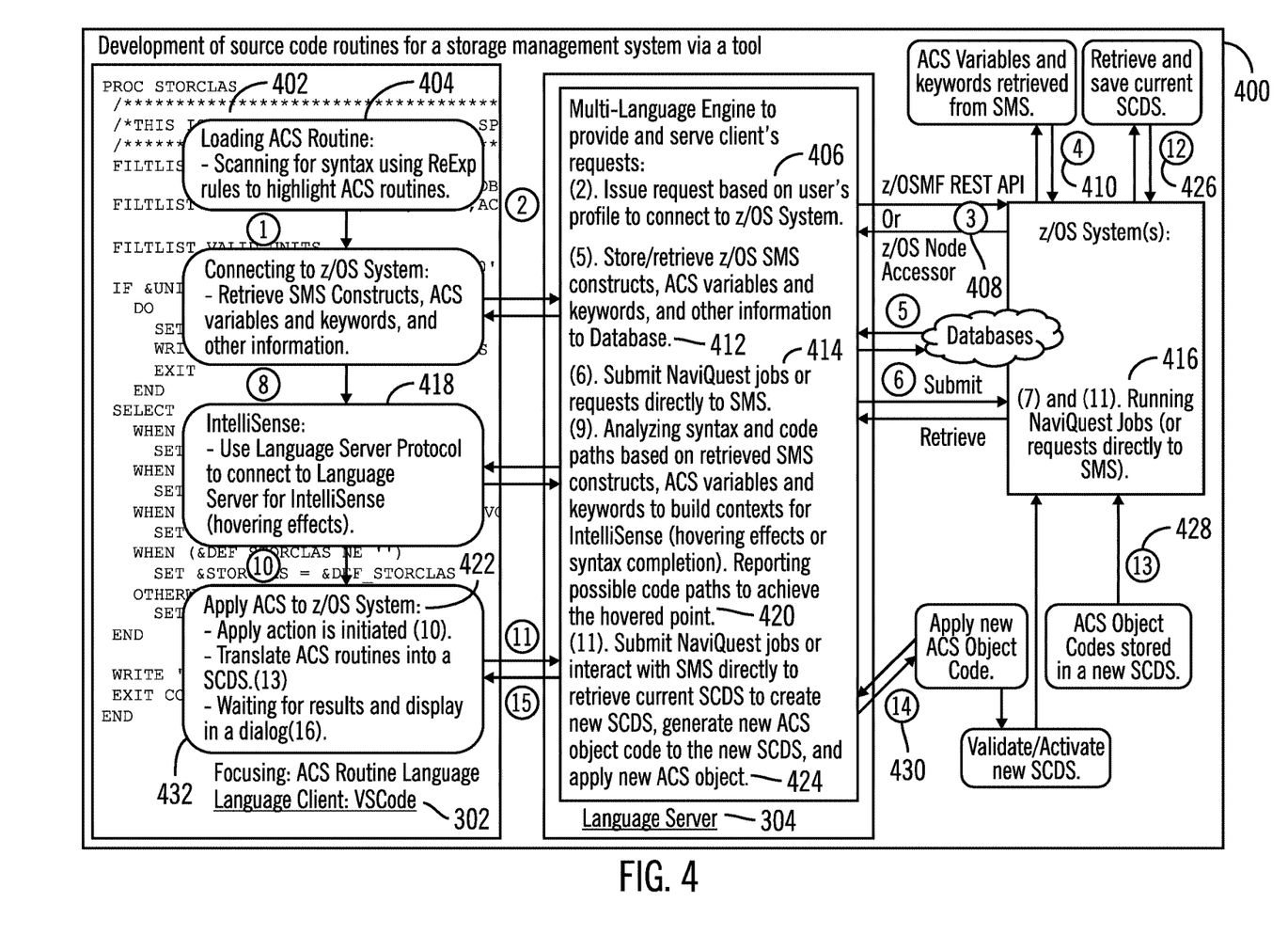
FIG. 4 illustrates a block diagram that shows the development of source code routines for a storage management system via a tool, in accordance with certain embodiments.

FIG. 4 illustrates a block diagram 400 that shows the development of source code routines for a storage management system via a tool, in accordance with certain embodiments. While FIG. 4 describes the development of source code routines in a z/OS operating system environment with ACS routines, other operating systems and other types of storage management routines may be used in alternative environments.

Exemplary ACS routines that include code snippets or code segments are shown via reference numeral 402. A loading is performed of ACS routines and a scanning of the syntax of the language is performed using regular expression and the ACS routines are highlighted by the tool. A request is issued based on a user's profile to connect to a z/OS system (as shown via reference numeral 406). Various z/OS based protocols are used for communication between the language server 304 and the z/OS system 306 as shown via reference numeral 408. ACS variables and keywords are retrieved from the SMS (reference numeral 410) and the z/OS SMS constructs, ACS variable, and keywords and other information are stored to and retrieved from databases (reference numeral 412).

Subsequently, Naviquest jobs or other requests are directly made to SMS and executed in the z/OS system (reference numeral 416), where Naviquest is a data and storage management tool for implementing, testing, and verifying the SMS environment and the Naviquest jobs may include scripts.

A mechanism referred to an intellisense uses a language server protocol to connect to a language server for intellisense which is a type of hovering operation over items of interest via a control element (reference numeral 418). The syntax and code paths are analyzed based on retrieved SMS constructs, ACS variables and keywords to build contexts for the intellisense mechanism to display via hovering effects potential syntax completion, etc. The possible code paths may be reported during the process (shown via reference numeral 420). The ACS is applied to the z/OS system via an apply action (reference numeral 422), and Naviquest jobs or direct interaction with SMS used to retrieve current SCDS to create a new SCDS, and further a new ACS object code is generated to the new SCDS and the new ACS object is applied (reference numerals 424, 426, 428, 430). The language client waits for the results and displays the results in a dialog (reference numeral 432).

Therefore, FIG. 4 illustrates the operations shown in FIG. 2 as implemented in a z/OS system with ACS routines and Naviquest jobs. The storage code development management tool performs automatic generating, verifying, and applying of class selection routines utilizing predefined or modeled code blocks in the operations shown in FIG. 4.

Figure 5:
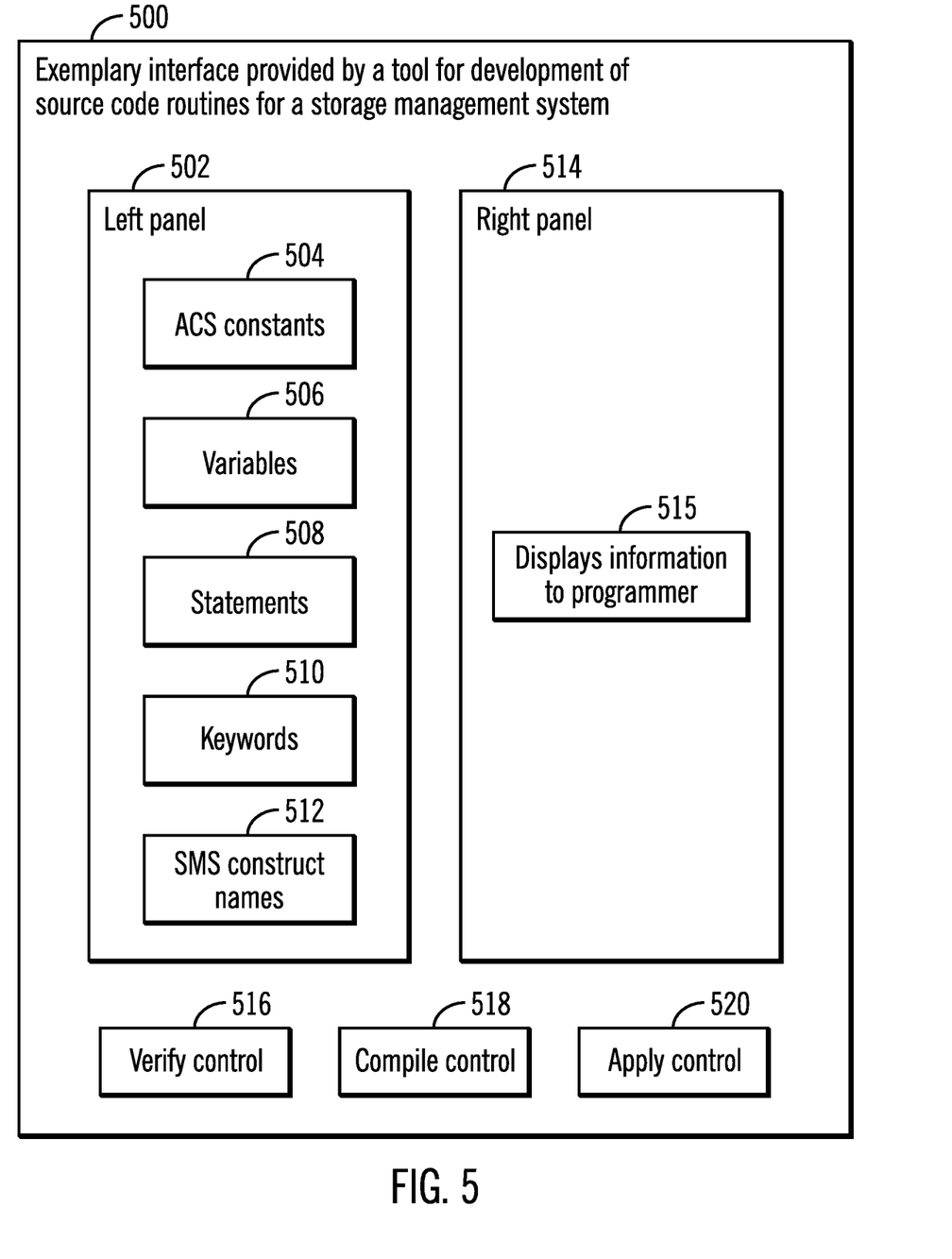
FIG. 5 illustrates a block diagram of an exemplary interface provided by a tool for development of source code routines for a storage management system, in accordance with certain embodiments.

FIG. 5 illustrates a block diagram 500 of an exemplary interface provided by a tool for development of source code routines for a storage management system, in accordance with certain embodiments.

The left panel 502 of the interface may include code with ACS constants 504, variables 506, statements 508, keywords, SMS construct names 512, etc., and the tool may be used for facilitating programming with such elements. The right panel 514 is used to assist the programmer by displaying various types of information (shown via reference numeral 515), and additional controls such as a verify control 516, a compile control 518 and an apply control 520 are provided.

FIG. 6 illustrates a block diagram 600 that shows the details of a development environment for development of source code routines for a storage management system, in accordance with certain embodiments shown via the interface in FIG. 5.

The tool may be used to pick an ACS sample in the folder on the left panel 502 and display it on the right panel 514 (as shown via reference numeral 602). The tool may also be used to click on a variable and statement on the left panel 502 to expand its definition and usage description (as shown via reference numeral 604).

In certain embodiments, the left panel 502 has all the ACS constants, Read-Only Variables, Read-Write variables, and statements to drag to the right panel 514 (as shown via reference numeral 606). The definition and usage description for each existing or new variable may be automatically retrieved from SMS and added to the tool (as shown via reference numeral 608).

In certain embodiments, the tool may be used to perform a hover operation over each keyword in a statement to display its description and possible usages (as shown via reference numeral 610). Hovering over each SMS construct name in a statement may display its definition in either the SCDS the ACS routine will be applied to, or the active configuration (as shown via reference numeral 612).

In further embodiments, hovering over each SMS construct name in a statement displays the possible paths that SMS construct name can be set (as shown via reference numeral 614).

In certain embodiments, hovering over an SMS construct name which happens to be a storage group name may display options to display the storage group definition or to list out the associated volume list of the storage group (as shown via reference numeral 616).

In further embodiments, clicking the verify control 516 (e.g., a verify button) may trigger a 'login' to a z/OS system to perform a verification process. The verification process may internally submit a Naviquest job or other job to verify an ACS routine (as shown via reference numeral 618). There is also a compile control 518 (e.g., a compile button) to generate object code which can be done via Naviquest job as well (as shown via reference numeral 620). After the ACS routine is compiled successfully, the programmer may click the apply control 520 to apply it to the system. It will apply to the active SCDS and display status (as shown via reference numeral 622). The mechanism keeps tracks of ACS routines in a database or on the systems to be retrieved later (as shown via reference numeral 624).

Figure 7:
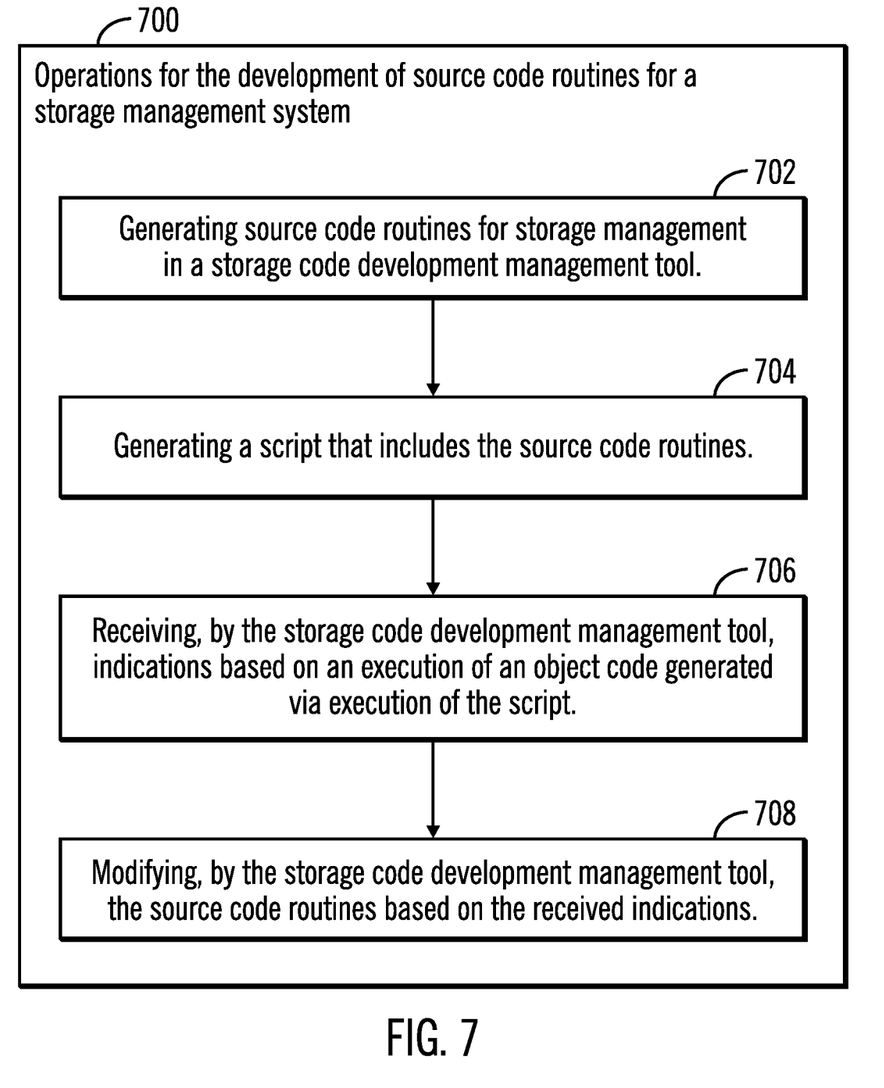
FIG. 7 illustrates a flowchart that shows operations for the development of source code routines for a storage management system, in accordance with certain embodiments.

FIG. 7 illustrates a flowchart 700 that shows operations for the development of source code routines for a storage management system, in accordance with certain embodiments. The operations shown in FIG. 7 may be implemented in a source code management system tool that executes in the development computational device 102 or the language client 302.

Control starts at block 702 in which source code routines are generated for storage management in a storage code development management tool. A script that includes the source code routines is generated (at block 704).

From block 704 control proceeds to block 706 in which the storage code development management tool receives indications based on an execution of an object code generated via execution of the script. The storage code development management tool modifies (at block 708). the source code routines based on the received indications.

Therefore, FIGS. 1-7 illustrates certain embodiments to manage source code development for a storage system by using an IDE tool that incorporates information provided by the storage system.

Cloud Computing Environment

Cloud computing is a model for enabling convenient, on-demand network access to a shared pool of configurable computing resources (e.g., networks, servers, storage, applications, and services) that can be rapidly provisioned and released with minimal management effort or service provider interaction.

Figure 8:
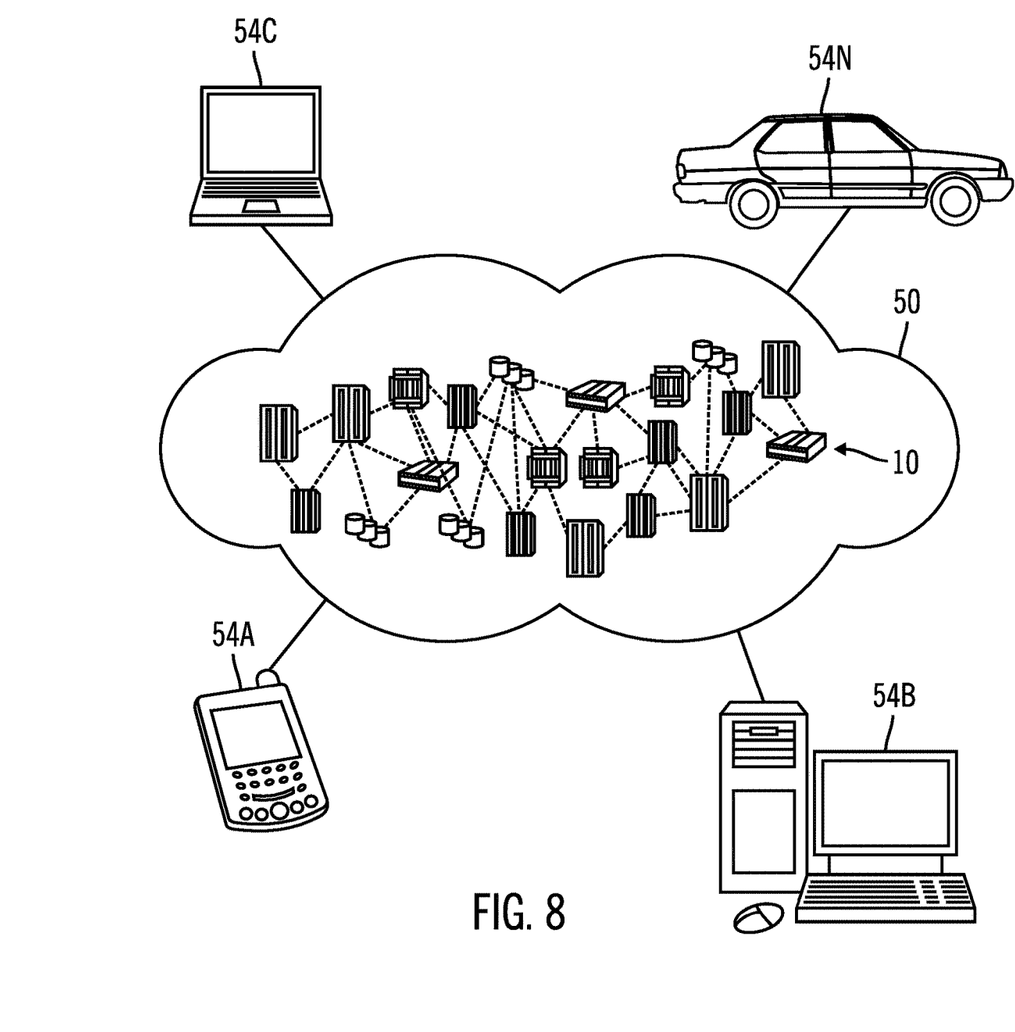
FIG. 8 illustrates a block diagram of a cloud computing environment, in accordance with certain embodiments.

Referring now to FIG. 8, an illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 8 are intended to be illustrative only and that computing nodes 10 and cloud computing environment 50 can communicate with any type of computerized device over any type of network and/or network addressable connection (e.g., using a web browser).

Figure 9:
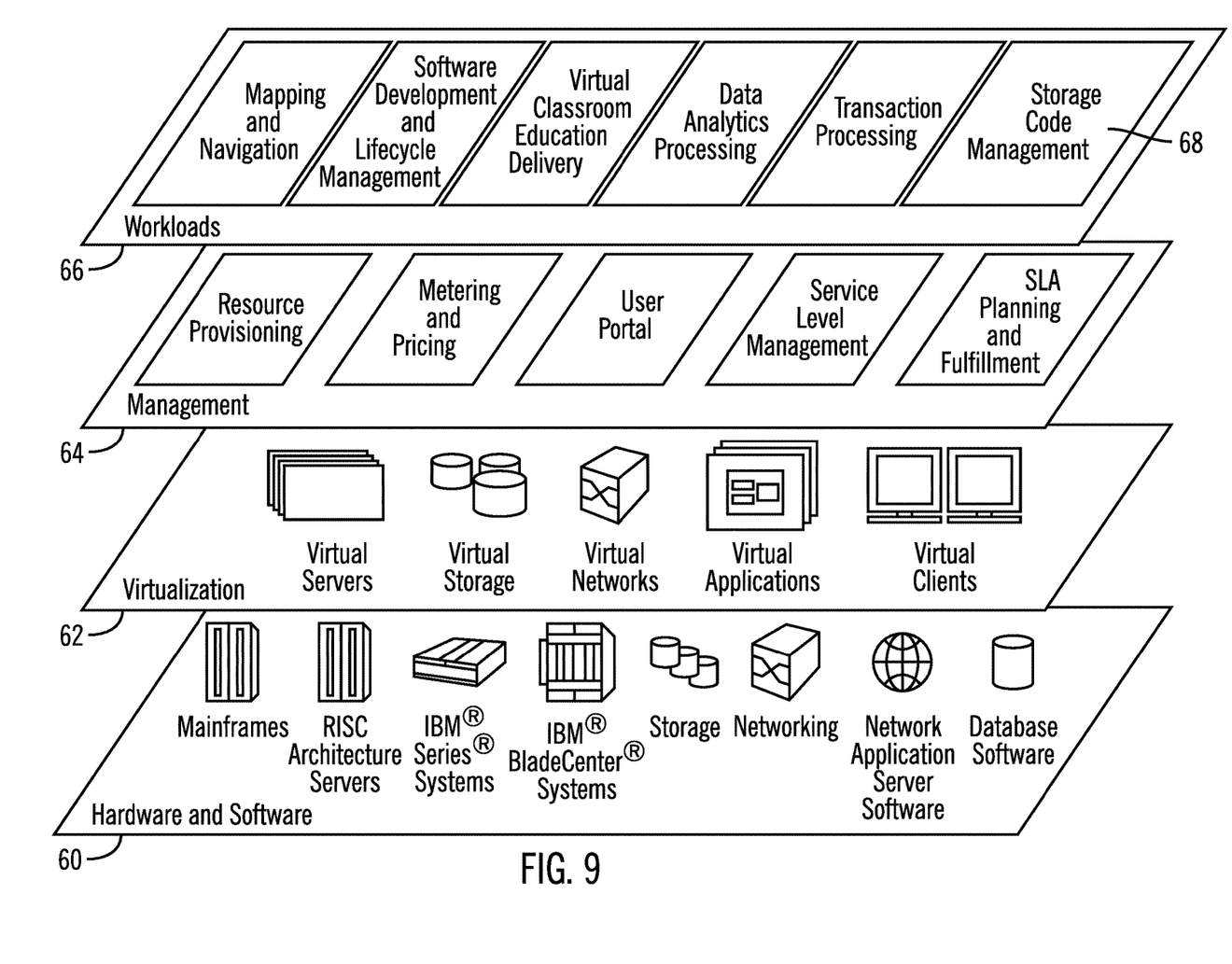
FIG. 9 illustrates a block diagram of further details of the cloud computing environment of FIG. 8, in accordance with certain embodiments.

Referring now to FIG. 9, a set of functional abstraction layers provided by cloud computing environment 50 (FIG. 8) is shown. It should be understood in advance that the components, layers, and functions shown in FIG. 9 are intended to be illustrative only and embodiments of the invention are not limited thereto.

Hardware and software layer 60 includes hardware and software components. Examples of hardware components include mainframes, in one example IBM zSeries* systems; RISC (Reduced Instruction Set Computer) architecture based servers, in one example IBM pSeries* systems; IBM xSeries* systems; IBM BladeCenter* systems; storage devices; networks and networking components. Examples of software components include network application server software, in one example IBM Web Sphere* application server software; and database software, in one example IBM DB2* database software.

* IBM, z/OS, zSeries, pSeries, xSeries, BladeCenter, Web Sphere, and DB2 are trademarks of International Business Machines Corporation registered in many jurisdictions worldwide.

Virtualization layer 62 provides an abstraction layer from which the following examples of virtual entities may be provided: virtual servers; virtual storage; virtual networks, including virtual private networks; virtual applications and operating systems; and virtual clients.

In one example, management layer 64 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA.

Workloads layer 66 provides examples of functionality for which the cloud computing environment may be utilized. Examples of workloads and functions which may be provided from this layer include: mapping and navigation; software development and lifecycle management; virtual classroom education delivery; data analytics processing; transaction processing; and storage code management 68 as shown in FIGS. 1-9.

Additional Embodiment Details

The described operations may be implemented as a method, apparatus or computer program product using standard programming and/or engineering techniques to produce software, firmware, hardware, or any combination thereof. Accordingly, aspects of the embodiments may take the form of an entirely hardware embodiment, an entirely software embodiment (including firmware, resident software, microcode, etc.) or an embodiment combining software and hardware aspects that may all generally be referred to herein as a "circuit," "module" or "system." Furthermore, aspects of the embodiments may take the form of a computer program product. The computer program product may include a computer readable storage medium (or media) having computer readable program instructions thereon for causing a processor to carry out aspects of the present embodiments.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present embodiments may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present embodiments.

Aspects of the present embodiments are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instruction.

Figure 10:
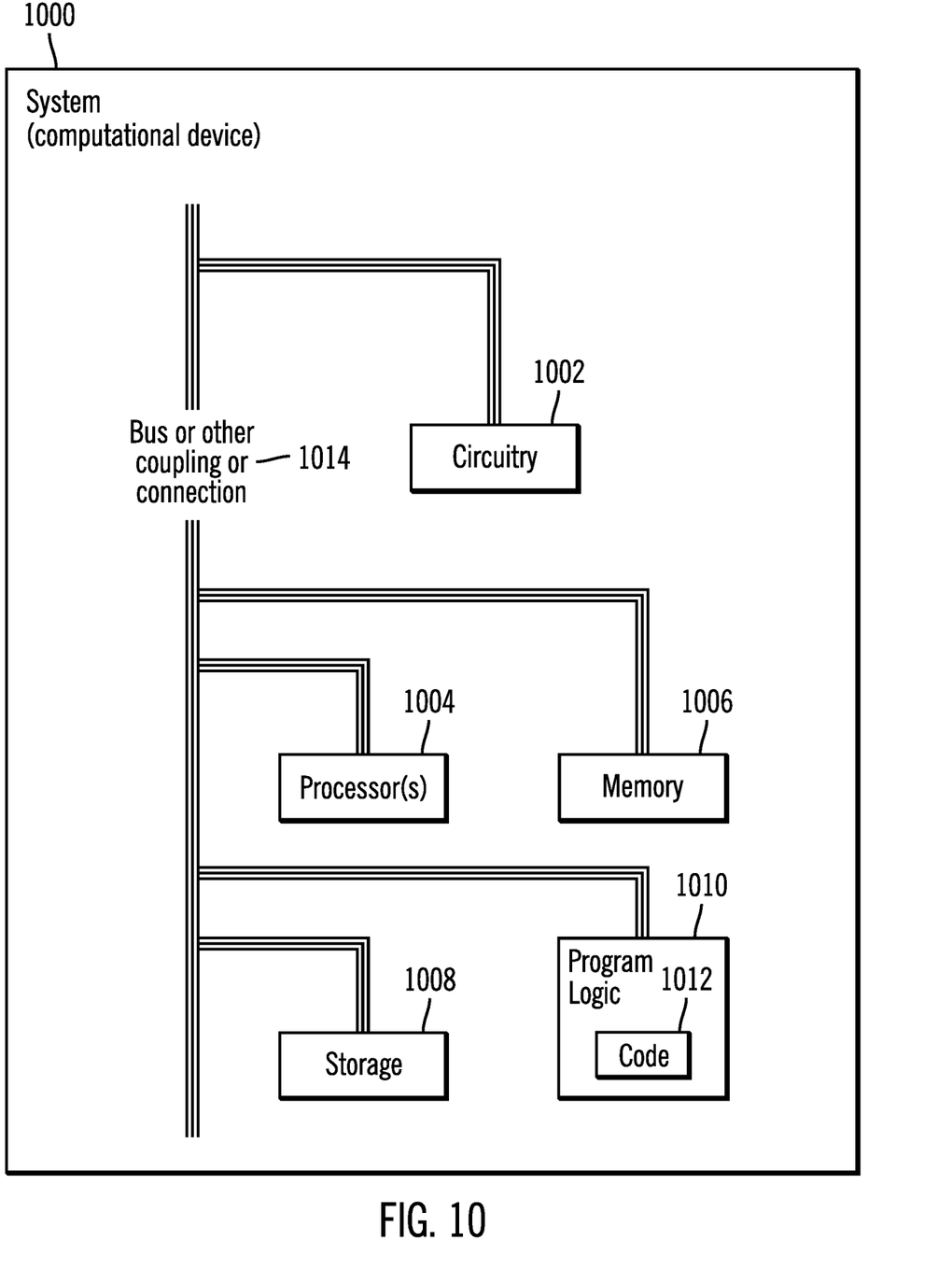
FIG. 10 illustrates a block diagram of a computational system that shows certain elements that may be included in the computational device described in FIGS. 1-9, in accordance with certain embodiments.

FIG. 10 illustrates a block diagram that shows certain elements that may be included in the computational device 102 or other computational devices 104, 302, 304, 306, in accordance with certain embodiments. The system 1000 may include a circuitry 1002 that may in certain embodiments include at least a processor 1004. The system 1000 may also include a memory 1006 (e.g., a volatile memory device), and storage 1008. The storage 1008 may include a non-volatile memory device (e.g., EEPROM, ROM, PROM, flash, firmware, programmable logic, etc.), magnetic disk drive, optical disk drive, tape drive, etc. The storage 1008 may comprise an internal storage device, an attached storage device and/or a network accessible storage device. The system 1000 may include a program logic 1010 including code 1012 that may be loaded into the memory 1006 and executed by the processor 1004 or circuitry 1002. In certain embodiments, the program logic 1010 including code 1012 may be stored in the storage 1008. In certain other embodiments, the program logic 1010 may be implemented in the circuitry 1002. One or more of the components in the system 1000 may communicate via a bus or via other coupling or connection 1014. Therefore, while FIG. 10 shows the program logic 1010 separately from the other elements, the program logic 1010 may be implemented in the memory 1006 and/or the circuitry 1002.

Certain embodiments may be directed to a method for deploying computing instruction by a person or automated processing integrating computer-readable code into a computing system, wherein the code in combination with the computing system is enabled to perform the operations of the described embodiments.

The terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

Further, although process steps, method steps, algorithms or the like may be described in a sequential order, such processes, methods and algorithms may be configured to work in alternate orders. In other words, any sequence or order of steps that may be described does not necessarily indicate a requirement that the steps be performed in that order. The steps of processes described herein may be performed in any order practical. Further, some steps may be performed simultaneously.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the present invention need not include the device itself.

At least certain operations that may have been illustrated in the figures show certain events occurring in a certain order. In alternative embodiments, certain operations may be performed in a different order, modified or removed. Moreover, steps may be added to the above described logic and still conform to the described embodiments. Further, operations described herein may occur sequentially or certain operations may be processed in parallel. Yet further, operations may be performed by a single processing unit or by distributed processing units.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A method, comprising:
generating source code routines for storage management in a storage code development management tool;
generating a script that includes the source code routines;
receiving, by the storage code development management tool, indications based on an execution of an object code generated via execution of the script;
modifying, by the storage code development management tool, the source code routines based on the received indications; and
responsive to selecting a source code routine sample in the storage code development management tool, selecting a variable and statement to expand definition and usage description.

2. The method of claim 1, wherein the storage code development management tool performs automatic generating, verifying, and applying of class selection routines by utilizing predefined or modeled code blocks.

3. The method of claim 1, the method further comprising: applying a source code routine to an active configuration; and verifying the source code routine utilizing an internally submitted job request.

4. A method, comprising:
generating source code routines for storage management in a storage code development management tool;
generating a script that includes the source code routines;
receiving, by the storage code development management tool, indications based on an execution of an object code generated via execution of the script;
modifying, by the storage code development management tool, the source code routines based on the received indications;
retrieving a definition and usage description for each existing or new variable from a storage management system via a language server; and
adding the retrieved definition and usage description to the source code development management tool for modifying the source code routines.

5. The method of claim 4, the method further comprising: responsive to receiving a compile selection by a user, generating the object code; and responsive to generating the object code, applying the object code to a storage system.

6. The method of claim 4, wherein the source code routines are stored in a repository for subsequent retrieval.

7. A system, comprising:
a memory; and a processor coupled to the memory, wherein the processor performs operations, the operations comprising:

generating source code routines for storage management in a storage code development management tool;

generating a script that includes the source code routines;

receiving, by the storage code development management tool, indications based on an execution of an object code generated via execution of the script;

modifying, by the storage code development management tool, the source code routines based on the received indications; and responsive to selecting a source code routine sample in the storage code development management tool, selecting a variable and statement to expand definition and usage description.

8. The system of claim 7, wherein the storage code development management tool performs automatic generating, verifying, and applying of class selection routines by utilizing predefined or modeled code blocks.

9. The system of claim 7, the operations further comprising: applying a source code routine to an active configuration; and verifying the source code routine utilizing an internally submitted job request.

10. A system, comprising:

a memory; and a processor coupled to the memory, wherein the processor performs operations, the operations comprising:

generating source code routines for storage management in a storage code development management tool;

generating a script that includes the source code routines;

receiving, by the storage code development management tool, indications based on an execution of an object code generated via execution of the script;

modifying, by the storage code development management tool, the source code routines based on the received indications;

retrieving a definition and usage description for each existing or new variable from a storage management system via a language server; and adding the retrieved definition and usage description to the source code development management tool for modifying the source code routines.

11. The system of claim 10, the operations further comprising: responsive to receiving a compile selection by a user, generating the object code; and responsive to generating the object code, applying the object code to a storage system.

12. The system of claim 10, wherein the source code routines are stored in a repository for subsequent retrieval.

13. A computer program product, the computer program product comprising a computer readable storage medium having computer readable program code embodied therewith, the computer readable program code configured to perform operations, the operations comprising:

generating source code routines for storage management in a storage code development management tool;

generating a script that includes the source code routines;

receiving, by the storage code development management tool, indications based on an execution of an object code generated via execution of the script;

modifying, by the storage code development management tool, the source code routines based on the received indications; and responsive to selecting a source code routine sample in the storage code development management tool, selecting a variable and statement to expand definition and usage description.

14. The computer program product of claim 13, wherein the storage code development management tool performs automatic generating, verifying, and applying of class selection routines by utilizing predefined or modeled code blocks.

15. The computer program product of claim 13, the operations further comprising: applying a source code routine to an active configuration; and verifying the source code routine by utilizing an internally submitted job request.

16. A computer program product, the computer program product comprising a computer readable storage medium having computer readable program code embodied therewith, the computer readable program code configured to perform operations, the operations comprising:

generating source code routines for storage management in a storage code development management tool;

generating a script that includes the source code routines;

receiving, by the storage code development management tool, indications based on an execution of an object code generated via execution of the script;

modifying, by the storage code development management tool, the source code routines based on the received indications;

retrieving a definition and usage description for each existing or new variable from a storage management system via a language server; and adding the retrieved definition and usage description to the source code development management tool for modifying the source code routines.

17. The computer program product of claim 16, the operations further comprising: responsive to receiving a compile selection by a user, generating the object code; and responsive to generating the object code, applying the object code to a storage system.

18. The computer program product of claim 16, wherein the source code routines are stored in a repository for subsequent retrieval.

* * * * *